United States Patent Office

2,957,762
Patented Oct. 25, 1960

2,957,762

NON-CORROSIVE AMMONIACAL AMMONIUM SALT SOLUTIONS

Donald C. Young, Fullerton, Calif., assignor, by mesne assignments, to Collier Carbon and Chemical Corporation, a corporation of California No Drawing. Filed May 7, 1956, Ser. No. 582,926

17 Claims. (Cl. 71—59)

This invention relates to the prevention of corrosion of ferrous metals by ammoniacal solutions of ammonium salts, and in particular concerns aqueous solutions of ammonium salts containing free ammonia and a novel corrosion inhibitor.

Ammonium salts, e.g., ammonium nitrate, ammonium sulfate, etc., have long been known and used as plant nutrients or fertilizers. For many years these salts were applied directly to the soil in granular form, even though it is difficult to prepare and store ammonium salts in such form by reason of their hygroscopicity and tendency to cake during storage. Within recent years, however, there has been considerable development in the technique of handling and applying fertilizers in liquid form, i.e., in the form of aqueous solutions, and because of the aforementioned difficulties associated with the production and storage of solid ammonium salts such technique is especially advantageous with respect to the use of these particular materials. In order to increase the amount of available nitrogen in such solutions it has been proposed that they contain free ammonia in addition to the ammonium salts. Thus, it has been proposed to prepare and market for agricultural purposes a composition containing about 65 percent ammonium nitrate, about 22 percent free ammonia, and about 13 percent water; such a composition contains about 41 percent total nitrogen as compared to only about 23 percent nitrogen for a 65 percent solution of ammonium nitrate. Unfortunately, however, ammoniacal solutions of ammonium nitrate and other ammonium salts of strong mineral acids are so highly corrosive with respect to ferrous metals that they cannot economically be handled, stored or transported in ordinary iron or steel equipment. The same corrosion problem is encountered in the practice of certain chemical processes in which use is made of concentrated ammonium salt solutions containing dissolved free ammonia.

It is accordingly an object of the present invention to provide a means for reducing the rate of corrosion of ferrous metals by aqueous ammonium salts containing free ammonia.

A further object is to provide aqueous ammoniacal ammonium salt compositions which are substantially free from corrosive effects on ferrous metals and at the same time are suitable for application to the soil as fertilizers.

Other objects will be apparent from the following detailed description of the invention, and various advantages thereof not specifically referred to herein will be apparent to those skilled in the art upon employment of the invention in practice.

I have found that the above and related objects may be realized through the use of certain metal ammines as corrosion inhibitors for aqueous ammoniacal ammonium salts. More particularly, I have found that aqueous ammoniacal solutions of ammonium salts which are normally highly corrosive with respect to ferrous metals may be rendered substantially non-corrosive by incorporating therein a soluble metal-ammonia complex salt of the type which is stable in aqueous solution and is formed by reaction between aqueous ammonia and a soluble metal salt. Certain of such complex salts are not well suited for application to the soil as fertilizers since the metallic ion adversely affects plant life; accordingly, the use of such salts as inhibitors in accordance with the invention will find widest application in the chemical processing field. Others of such salts, however, comprise metallic ions, e.g., copper and zinc, which are actually beneficial to plant life. Accordingly, they are eminently suited for use in fertilizing compositions.

As stated, the corrosion inhibitors provided by the invention are stable soluble metal-ammonia complex salts of the type formed by reaction between aqueous ammonia and a metal salt. For the most part, the metals which form ammonia complexes in such manner are those of groups Ib, IIb, VIa and VIII of the periodic system, e.g., copper, silver, gold, zinc, cadmium, mercury, chromium, cobalt, nickel, etc. A large number of such complex salts are described in volume X of "A Text-Book of Inorganic Chemistry" edited by J. Newton Friend (Griffen & Co., 1928), of which the nitrates, sulfates and halides of the tetra-ammino cupric ion, $Cu(NH_3)_4^{++}$, the di-ammino silver ion, $Ag(NH_3)_2^{+}$, the tetra-ammino zinc ion, $Zn(NH_3)_4^{++}$, the tetra-ammino cadmium ion, $Cd(NH_3)_4^{++}$, the hexa-ammino cobaltic ion, $Co(NH_3)_6^{+++}$, and the tetra-ammino-nickel ion, $Ni(NH_3)_4^{++}$ are the most widely known. By reason of their low cost and general availability, the nitrates and sulfates of these particular metal-ammonia complex ions are preferred, especially tetra-ammino cupric nitrate and sulfate and tetra-ammino zinc nitrate.

In preparing the inhibited compositions of the invention, the metal-ammonia complex salt may be prepared as such, either in solution or solid form, and simply admixed with the ammoniacal ammonium salt solution. However, since the metal complex salts which are effective are those which are formed simply upon the addition of a soluble metal salt to aqueous ammonia, it is usually more convenient to form the inhibitors in situ simply by adding the metal salt, or an aqueous solution thereof, to the ammoniacal ammonium salt solution which is to be inhibited. Thus, in preparing one of the preferred inhibited fertilizing compositions of the invention, a solution of cupric nitrate is added directly to an ammoniacal ammonium nitrate solution whereupon cuprammonium nitrate $(Cu(NH_3)_4)(NO_3)_2$, is immediately formed and the composition assumes the deep blue color of the cuprammonium ion.

The amount of complex salt required to effect a substantial reduction in the normal rate of corrosion of a particular ammoniacal ammonium salt solution depends primarily upon the concentration of free ammonia and ammonium salt in such solution and the temperature conditions to which the solution is subjected while in contact with a ferrous metal. In general, however, the optimum amount is between about 0.0001 and about 0.01 part by weight of the metal-ammine complex per part of the combined weight of the ammonia and ammonium salt, and the minimum amount will be that sufficient to effect a substantial reduction in the rate of corrosion. The preferred fertilizing composition of the invention are aqueous solutions containing between about 50 and about 68 percent by weight of ammonium nitrate, between about 15 and about 25 percent by weight of free ammonia, and between about 0.01 and about 0.5 percent by weight of one of the aforementioned metal-ammine complexes, preferably cuprammonium nitrate. Ammonium sulfate, ammonium chloride, ammonium bromide, and other ferrocorrosive ammonium salts of mineral acids may be substituted for the ammonium nitrate.

In order to demonstrate the effectiveness of the present class of metal-ammine complex salts in inhibiting the corrosive action of ammoniacal ammonium salt solutions on ferrous metals, the following test procedure has been employed: Mild Steel (ASTM A-283) test specimens, approximately 1" x ½" x 3/16", are polished with No. 150 and No. 240 Alundum paper and vapor-degreased above boiling isopropanol, and are then accurately weighed. Two specimens are mounted on a glass rack which is suspended from a rocking arm in a glass vessel containing 200 ml. of the composition to be tested. The arm is mechanically connected to a motor controlled by a cycle timer so that the test specimen is gradually moved in and out of the test solution in periodic steps. The apparatus is allowed to operate at room temperature in the presence of air for a given period of time, after which the test specimens are removed from the rack, washed in distilled water and weighed. The following table presents the data obtained by subjecting a number of test compositions to such procedure:

| Test No | Test Composition | Duration of Test, days | Wt. Loss, gm./m.²/day | Appearance of Composition |
|---|---|---|---|---|
| 1 | Composition A¹ | 21 | 173.34 | Heavy black sludge. |
| 2 | Composition A¹ + 0.2% Cu(NO₃)₂. | 21 | nil | Unchanged. |
| 3 | Composition B ² | 10 | 30.33 | Rusty sludge. |
| 4 | Composition B ² + 0.2% Cu(NO₃)₂. | 21 | nil | Unchanged. |

¹ Composition A:                                          Percent
    $NH_4NO_3$ ---------------------------------------------- 5.8
    $NH_3$ --------------------------------------------------- 16.0
    $(NH_4)_2SO_4$ ----------------------------------------- 4.0
    Water -------------------------------------------------- 74.2
² Composition B:
    $(NH_4)_2SO_4$ ----------------------------------------- 4.5
    $NH_3$ --------------------------------------------------- 16.0
    Water -------------------------------------------------- 79.5

In a second series of tests, 0.05 percent by weight of various metal salts was added to samples of a 65 percent by weight aqueous solution of ammonium nitrate containing 21.7 percent by weight of dissolved free ammonia. Steel test specimens were then immersed in the compositions so prepared and were allowed to stand therein at room temperature for 20 days, after which they were examined for signs of corrosion. The following results were obtained:

| Test No. | Metal Salt | Condition of Test Specimen | Condition of Test Composition |
|---|---|---|---|
| 5 | None | Heavily corroded; partially destroyed. | Heavy sludge. |
| 6 | $Ni(NO_3)_2$ | Clean | Unchanged. |
| 7 | $Cr(NO_3)_3$ | do | Unchanged. |
| 8 | $Zn(NO_3)_2$ | do | Unchanged. |
| 9 | $Cu(NO_3)_2$ | do | Unchanged. |

Other modes of applying the principle of my invention may be employed instead of those explained, change being made as regards the materials or methods employed, provided the step or product stated by any of the following claims, or the equivalent of such stated step or product, be employed or obtained.

I, therefore, particularly point out and distinctly claim as my invention:

1. In a process wherein an aqueous ammoniacal solution consisting of an ammonium salt of a strong mineral acid and free ammonia which is normally corrosive with respect to ferrous metals is maintained in contact with a ferrous metal, the method of inhibiting the corrosive action of said solution on said metal which comprises incorporating in said solution a water-soluble stable ammine complex salt of a metal selected from the class consisting of the metals of groups Ib, IIb, VIa and VIII of the periodic system, said metal-ammine salt being provided in an amount sufficient to decrease substantially the rate of said corrosion.

2. The method of claim 1 wherein the said metal-ammine salt is a tetra-ammino cupric salt.

3. The method of claim 1 wherein the said metal-ammine salt is a tetra-ammino zinc salt.

4. The method of claim 1 wherein the said salt is cuprammonium nitrate.

5. The method of claim 1 wherein the said ammonium salt is ammonium nitrate.

6. The method of claim 1 wherein the said ammonium salt is ammonium sulfate.

7. In a process wherein an aqueous solution consisting of an ammonium salt selected from the class consisting of ammonium nitrate and ammonium sulfate and containing dissolved free ammonia is maintained in contact with mild steel and is corrosive thereto, the method of inhibiting the corrosive action of said solution on said mild steel which comprises forming and maintaining a corrosion-inhibiting soluble metal-ammine complex in said solution by dissolving in said solution a water-soluble salt selected from the group consisting of the nitrates, sulfates and halides of the metals of group Ib, IIb, VIa, VIII of the periodic system which is capable of combining with said free ammonia to form said soluble metal-ammine complex.

8. The method of claim 7 wherein the said metal salt is cupric nitrate.

9. The method of claim 8 wherein the said ammonium salt is ammonium nitrate.

10. The method of claim 8 wherein the said ammonium salt is ammonium sulfate.

11. The method of claim 8 wherein the said metal salt is employed in an amount sufficient to provide between about 0.0001 and about 0.01 part by weight of the said metal-ammine complex per part of the combined weight of the said free ammonia and the said ammonium salt.

12. A composition of matter consisting of an aqueous solution of an ammonium salt of the class consisting of ammonium nitrate and ammonium sulfate, free ammonia, and sufficient of a stable, soluble, metal-ammine complex to render said solution substantially non-corrosive with respect to mild steel, the metal of said metal-ammine being selected from the class consisting of metals of groups Ib, IIb, VIa and VIII of the periodic system.

13. A composition as defined by claim 12 wherein the said metal-ammine complex is the cuprammonium complex.

14. A composition as defined by claim 12 wherein the said ammonium salt is ammonium nitrate.

15. A composition as defined by claim 12 wherein the said ammonium salt is ammonium sulfate.

16. A fertilizing composition substantially non-corrosive to mild steel comprising an aqueous solution containing between about 50 and about 68 percent by weight of ammonium nitrate, between about 15 and 25 percent by weight of dissolved free ammonia, and between about 0.01 and about 0.5 percent of a stable, soluble, metal-ammine complex, the metal of said metal-ammine being selected from the class consisting of metals of groups Ib, IIb, VIa and VIII of the periodic system.

17. A composition according to claim 16 wherein the said metal-ammine complex is a cuprammonium salt.

References Cited in the file of this patent

UNITED STATES PATENTS

| | | |
|---|---|---|
| 2,104,754 | Marsh et al. | Jan. 11, 1938 |
| 2,129,689 | Hetherington | Sept. 13, 1938 |
| 2,215,092 | Beekhuis | Sept. 17, 1940 |
| 2,238,651 | Keenen | Apr. 15, 1941 |
| 2,279,200 | Keenen | Apr. 7, 1942 |
| 2,566,887 | Hook | Sept. 4, 1951 |
| 2,647,820 | Forward | Aug. 4, 1953 |

FOREIGN PATENTS

| | | |
|---|---|---|
| 544,675 | Great Britain | Apr. 23, 1942 |

OTHER REFERENCES

Meldrum et al.: "Semimicro Qualitative Analysis," 1939, pp. 110–14.

Armour Chemical Div. "Duomeens" pamphlet, pp. 1–5, Feb. 21, 1956.